Oct. 12, 1937.   E. A. NELSON   2,095,344
AUTOMOBILE
Filed Nov. 25, 1935   3 Sheets-Sheet 3
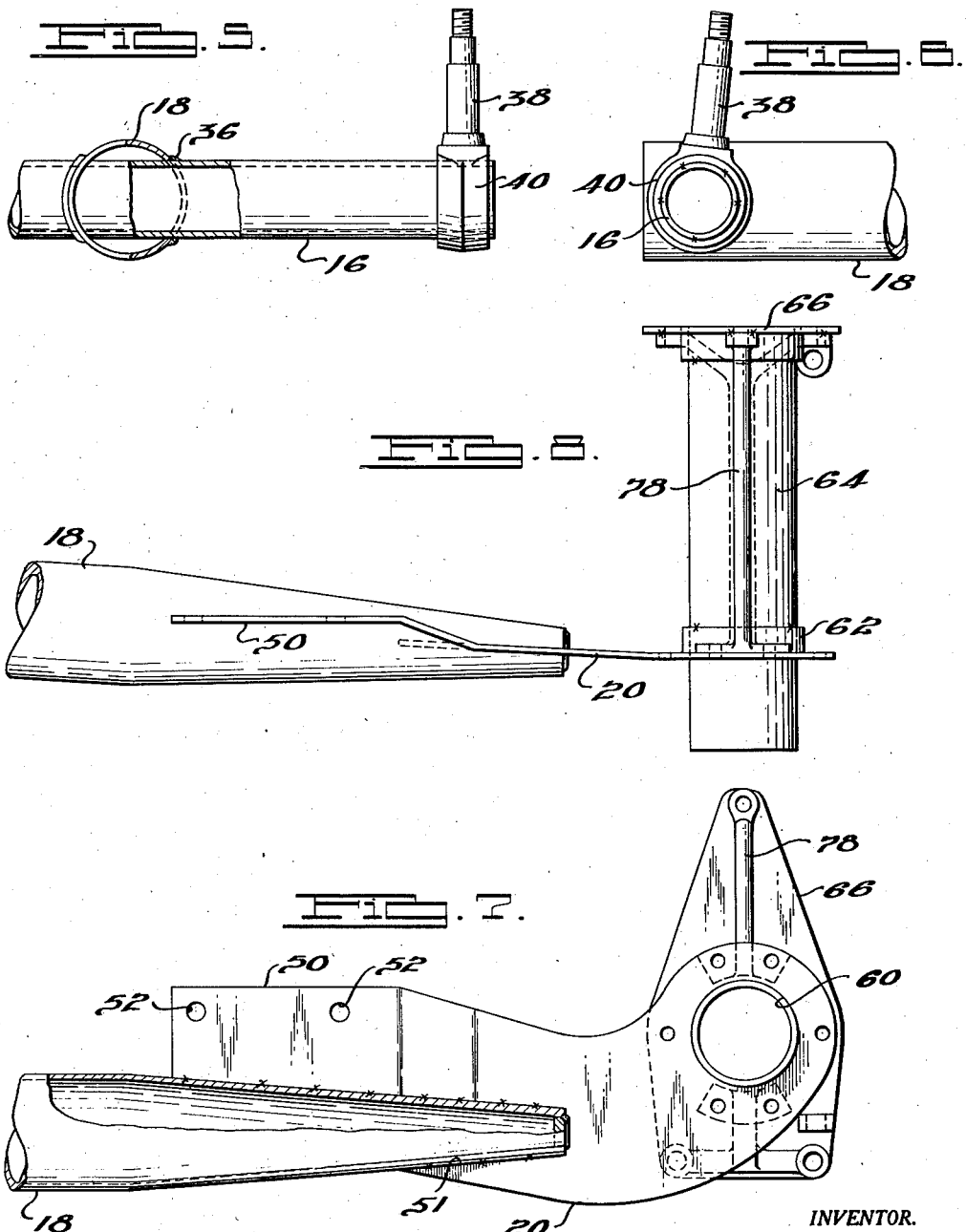
INVENTOR.
Emil A. Nelson.
BY
Harness, Dickey, Pierce & Hann
ATTORNEYS.

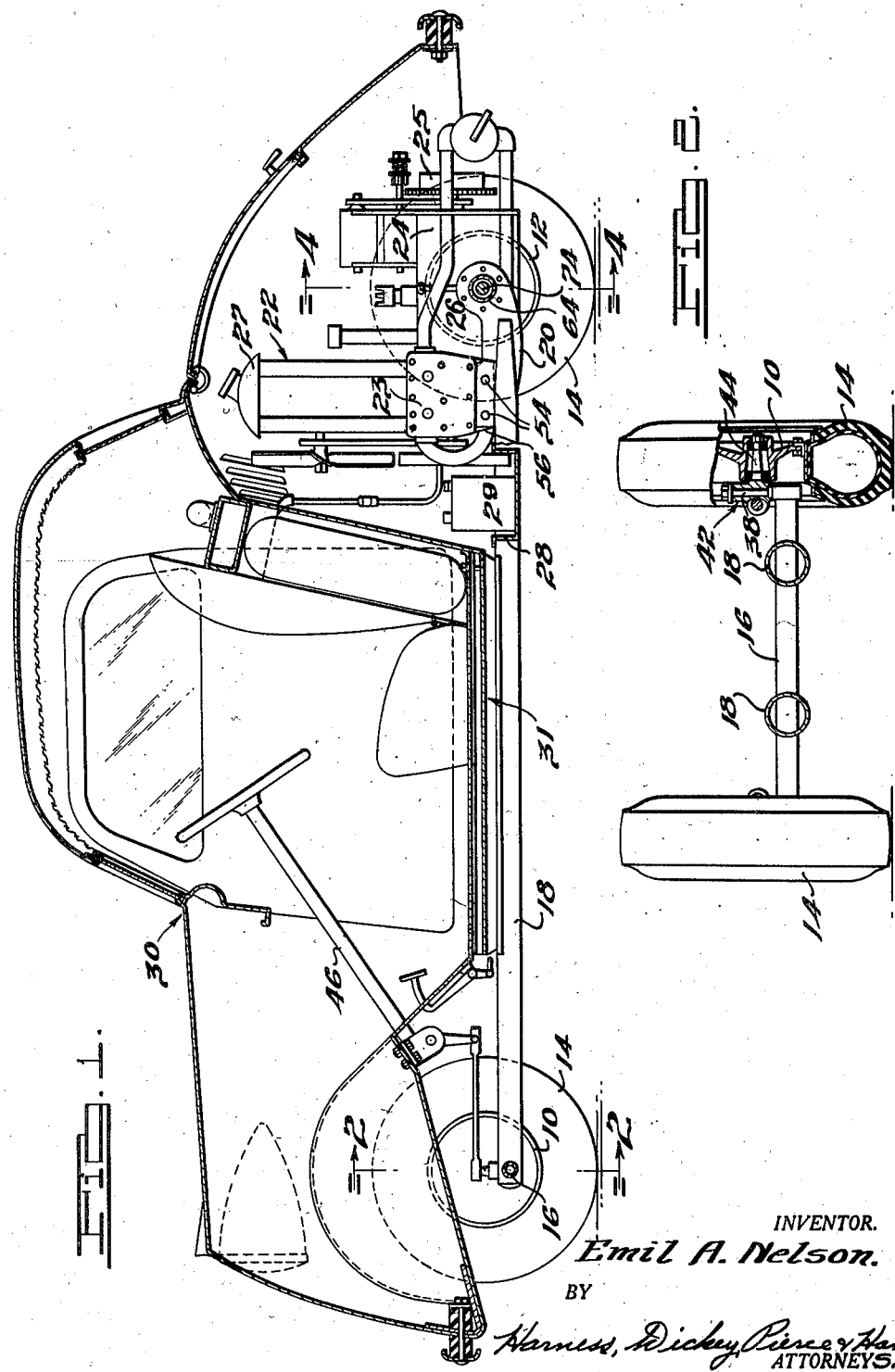

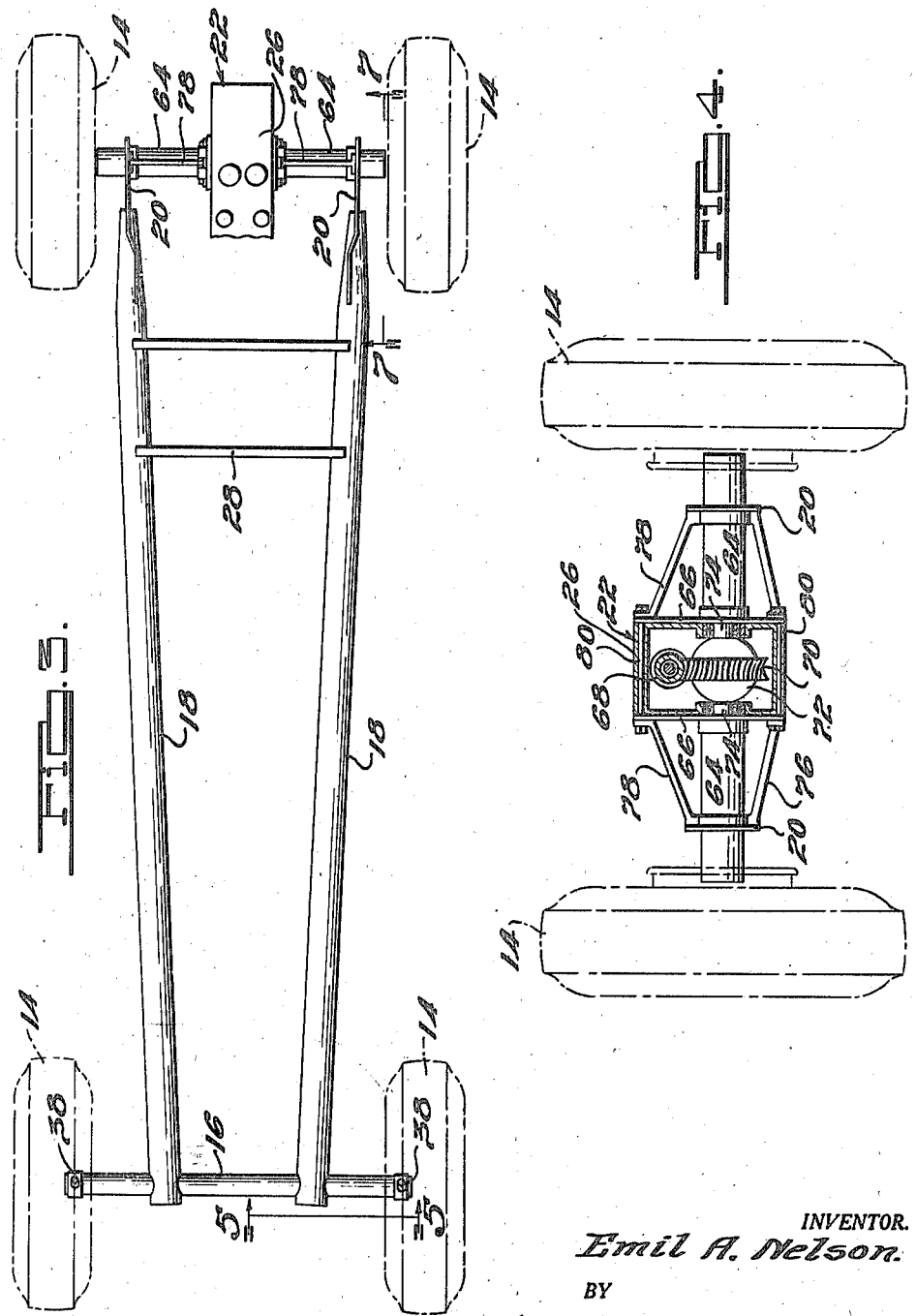

Patented Oct. 12, 1937

2,095,344

UNITED STATES PATENT OFFICE 2,095,344

AUTOMOBILE

Emil A. Nelson, St. Clair Shores, Mich., assignor, by direct and mesne assignments, of one-half to Du Bois Young, Bloomfield Hills, Mich., and one-fourth to Frank W. Gay, Jackson, Mich.

Application November 25, 1935, Serial No. 51,366

12 Claims. (Cl. 180—54)

This invention relates to automobiles and particularly to a chassis frame structure therefor, the principal object being the provision of a chassis frame of simple construction, of light weight and one that is economical to manufacture and sell.

Objects of the invention include the provision of a chassis frame including tubular frame side members and a front axle rigidly fixed thereto in a novel manner; the provision of a chassis for an automobile including frame side members of tubular construction and a front axle of tubular construction piercing the frame side members and rigidly secured thereto; the provision of an automobile chassis including a tubular front axle and a novel means of mounting the steering knuckles thereon; the provision of an automobile chassis having a novel arrangement for supporting the power plant therein; the provision of an automobile chassis including frame side members provided with brackets fixed to the rear end thereof and axle housings rigidly fixed to said brackets; the provision of an automobile chassis including frame side members and a power plant disposed between the rear ends thereof, the power plant serving as the sole means for rigidly interconnecting the rear ends of said frame side members; the provision of an automobile chassis frame including tubular side members, the rear ends of said frame members being of increased wall thickness and bracket members being welded to said thickened wall; and the provision of an automobile chassis frame including tubular side members materially yieldable between their ends in a vertical direction.

The above being among the objects of the present invention, the same consists of certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a vertical sectional view taken longitudinally through the center of an automobile, certain parts thereof being shown in side elevation.

Fig. 2 is a slightly enlarged, fragmentary, transverse, sectional view taken on the line 2—2 of Fig. 1, particularly illustrating the connection between the chassis frame side members and the front axle and the arrangement of the steering knuckle and steering spindle assembly.

Fig. 3 is a top plan view of the chassis for the automobile shown in Fig. 1, a portion only of the power plant being shown in connection therewith.

Fig. 4 is an enlarged partially sectioned transverse view taken on the line 4—4 of Fig. 1.

Fig. 5 is an enlarged partially broken, partially sectioned view of one end of the front axle and the connection between the front axle and one of the chassis frame side members, taken as on the line 5—5 of Fig. 3.

Fig. 6 is an end view of the construction shown in Fig. 5 taken from the right hand end thereof.

Fig. 7 is an enlarged, fragmentary, partially broken, partially sectioned view showing the connection between the rear ends of the chassis frame side members and their corresponding supporting bracket, taken as on the line 7—7 of Fig. 3.

Fig. 8 is a top plan view of the parts shown in Fig. 7.

The chassis and chassis frame organization forming the subject-matter of the present application is that shown in connection with the automobile construction shown and claimed in my co-pending application filed on even date herewith and serially numbered 51,365. As is explained in said co-pending application, the automobile has been designed with the idea of eliminating certain parts which are conventional in present day automobiles with the end in view of enabling a satisfactory automobile of conventional size to be produced and sold at prices materially under the prices of correspondingly sized automobiles of conventional construction. With this in mind the conventional spring suspension of conventional automobiles has been eliminated and the effect thereof on the passenger of the automobile has been obtained by a combination of two or more features, one of which is the provision of unusually large and unusually low pressure pneumatic tires, the second of which is the provision of pneumatic cushions for supporting the automobile body upon the chassis frame, and the third of which is the provision of a chassis frame which may yield to a material degree in a vertical direction between its ends and so supporting the body upon the chassis frame as to enable this yieldability of the chassis frame to be realized in providing an easier ride for the passengers. It will be understood, however, that in the broader aspects of the present invention and also that of the invention involved in the co-pending application above referred to, the yieldability of the frame is preferable but optional as there are many advantages to the frame construction per se regardless of such yieldability.

Preferably the chassis frame includes tubular frame side members. The front axle is preferably a tubular member rigidly interconnected to the front ends of the frame side members and preferably piercing the same. A novel construction is provided for mounting the steering knuckles on the ends of the front axle. The power plant of the automobile is positioned at the rear thereof and serves in and of itself to tie the rear ends of the chassis frame side members together. This is partially done in conjunction with the housings for the driving axles for the rear driving wheels and which axle housings are rigidly secured to brackets fixed to the rear ends of the chassis frame side members and which axle housings are also rigidly fixed with respect to the power plant of the automobile.

Referring to the drawings and particularly to Fig. 1 thereof, an automobile is shown which is of a type particularly adaptable for the use of a chassis frame structure embodying the present invention, the said automobile generally forming the subject-matter of my co-pending application above referred to. It includes front and rear pairs of road wheels 10 and 12, respectively, each of which is provided with a relatively large sectioned, low pressure pneumatic tire 14. The front wheels 10 are suitably mounted for swiveling action upon the ends of a front axle 16 which in turn is rigidly interconnected to the forward ends of the chassis frame side members 18. At their rear ends the chassis frame side members 18 are each provided with a bracket member 20 fixed thereto between which a unitary power plant generally indicated at 22 is located and secured. The power plant 22 includes an engine 23, transmission including a housing 24, clutch 25, final driving mechanism including a housing 26 and a radiator 27, together with other parts all arranged in a unitary assembly. The housing 26 serves to rigidly interconnect the brackets 20 and, where necessary or desirable, one or more chassis frame cross members may be provided between the frame side members 18, one such cross member being indicated at 28 and in this particular instance being so constructed and arranged as to provide for reception of the usual storage battery 29 therein. A body generally indicated at 30 is suitably supported on the chassis frame side members 18 through the intermediary of deformable pneumatic cushions indicated generally at 31. The details of construction of the body 30 and interconnection of the chassis frame and body through the pneumatic cushions 31 is brought out in detail in my co-pending application above referred to, and further information concerning the same may be there obtained. The power plant 22 also forms the subject-matter of another of my co-pending applications filed on even date herewith and serially numbered 51,367, and details of the construction thereof may be obtained therein.

The chassis frame side members 18 are of tubular construction and in the particular embodiment shown are of circular section. The front axle 16 is also of tubular section and circular section but of smaller diameter than the frame side members 18. As indicated in Figs. 2, 5, and 6, the front axle 16 pierces the forward ends of the side frame members 18 and it is welded thereto as at 36 (see Fig. 5).

The king pins 38 for the steering knuckles at opposite ends of the front axle 16 are each integrally connected at its lower end with a ring 40 which surrounds the corresponding outer end of the front axle 16 and is suitably fixed thereto as by welding. As indicated in Fig. 6, each king pin 38 is arranged at a suitable angle to the vertical as viewed from the side of the automobile so as to provide the proper caster for the steering road wheel and, if desired, may also be arranged at a suitable angle to the vertical as viewed longitudinally of the automobile so that its axis will substantially intersect the area of contact of the corresponding tire with the ground. This latter feature is not shown in the drawings but is conventional practice in the automobile art and may be employed if desired. As indicated in Fig. 2, a suitable spindle assembly indicated generally at 42 is pivotally mounted upon each king pin 38 and the corresponding front wheel 10 is rotatably mounted upon the corresponding spindle 44 thereof. Cooperating steering movements of the wheels 10 about the axes of the corresponding king pins 38 may be obtained by means of a conventional steering gear 46 shown mounted in the body 30 in Fig. 1 and connected to the steering spindle assembly 42 in accordance with conventional practice.

Although not essential to the broader aspects of the present invention, in accordance with a more limited phase of the present invention, the frame side members 18 are constructed of such size, wall thickness and material as to enable them to spring vertically between their opposite ends in normal use. The reasons and advantages for this are fully explained in my copending application first referred to above. Because of this fact, the wall thicknesses of the frame side members 18 are such that an attempt to rigidly weld the brackets 20 thereto, without special provision being made, might result in an unduly weakened and unsatisfactory condition of this end of the frame side members and the joint between them and the brackets 20. To obviate the possibilities of such an undesirable condition and to provide means whereby a satisfactorily secure connection may be made between the rear ends of the members 18 and their corresponding brackets 20, the rear ends of the frame side members 18 are swaged down into tapered condition as illustrated in the drawings. As particularly brought out in Fig. 7, this swaging operation upon the rear ends of the tubes 18 materially thickens the walls thereof and to such an extent as to permit the brackets 20 to be readily welded thereto without endangering burning through the walls of the tubes, and so strengthens the corresponding ends of the tubes as to satisfactorily permit them to absorb the stresses to which they will be subjected in service.

As best illustrated in Figs. 7 and 8, each brackets 20 comprises a main portion substantially centrally located with respect to the axis of the corresponding tube 18 and an inwardly offset portion 50, it being understood that all portions of the brackets 20 are disposed with the plane of their thickness vertical. The main portion of each bracket 20 is notched or recessed as at 51 so as to provide a socket for receiving the corresponding end of the corresponding frame side member 18, thereby to provide a greater area for welding the bracket to the frame side member and resulting in a more secure connection between them. As will be noted, the inwardly offset portions 50 are provided with a pair of holes 52 therein. These are for the purpose of receiving bolts 54 (see Fig. 1) which extend therethrough and through corresponding flanges 56 formed on the lower face of the cylinder block of the engine 23 so as to enable the cylinder block of the engine to be rigidly secured to the brackets 20. The engine thus serves as a chassis frame cross member.

As also best brought out in Figs. 7 and 8, the rear terminal portion of each of the brackets 20 is provided with a circular opening 60 therein and a portion of the metal of the bracket 20 displaced to form the opening 60 is drawn inwardly to form a circular sleeve or collar 62. The automobile rear axle includes two tubular housing portions 64 extending outwardly from the final drive housing 26 to a point closely adjacent the rear wheels 12. One of these axle housings 64 is fixed relative to each of the brackets 20 and is of a diameter to be closely received within the corresponding collar 62 and projects through the end of the bracket 20 as illustrated in Fig. 8, and is preferably secured in position therein by being welded to the collar 62. The inner end of each of the axle housings 64 is provided with a flange member 66 having a plane inner face disposed in normal relation with respect to the axis of the housing 64 and it is rigidly fixed to the housing 64 by welding or other suitable means. As illustrated in Fig. 4 the flange members 66 abut against the side faces of that portion of the power plant 22 forming the housing 26 for the final drive mechanism which encloses the driving worm 68 and driven worm gear 70. It will be understood that a suitable differential mechanism indicated generally at 72 is received within and driven by the worm wheel 70 and in turn actuates the driving axles or jack shafts 74 projecting outwardly therefrom through the axle housings 64.

In view of the fact that the rear axle of an automobile is subjected at times to severe vertically directed bending forces, it is preferable to reinforce this portion of the mechanism against forces acting in this direction. For this reason it will be noted that the flange members 66 are elongated in a vertical direction and tension rods 76 and compression members 78 are interposed between the lower extremities of the flange members 66 and the corresponding bracket 20 and the upper portions of the flange members 66 and the corresponding bracket 20 respectively. These tension rods 76 and compression members 78 are suitably flanged at their opposite extremities and welded or otherwise suitably secured to the flange members 66 and brackets 20 respectively. Additionally, in view of the fact that the housing 26 of the power plant 22 enclosing the worm wheel 70 is preferably of cast construction and, therefore, not capable of withstanding a great amount of tensile stress, bolts 80 are projected laterally through the housing 26 and through the corresponding ends of the members 76 and 78 and not only serve to rigidly clamp the flange members 66 and consequently the axle housings 64 to the housing 26 and power unit 22, but also serve to relieve the lower portion of the housing 26 from the necessity of taking any tensile stresses due to the bending forces above mentioned. The upper portion of the housing 26 will, of course, be subjected to compression stresses due to such bending forces and consequently the upper bolts 80 will serve primarily as means for clamping the flange members 66 to the power plant unit, the cast housing 26 being of ample strength to resist such compression stresses.

It will, of course, be understood from the foregoing description that the power plant unit 22 is actually employed as a stress transmitting connecting means between the rear ends of the frame side members 18 both because of the arrangement of parts shown in Fig. 4 and also because of the interconnection of the engine portion 23 of the power plant with the frame through the flanges 56 as above described.

It will be recognized that the above described structure will be unusually light in comparison with the load to be carried, may be constructed at a minimum of expense for labor and materials and, where the frame side members 18 are suitably constructed and arranged as to be capable of springing in a vertical direction between their ends, may be employed for considerably enhancing the riding qualities of the automobile.

It will be obvious to those skilled in the art, once the teachings of the present invention have been made known to them, that various changes and modifications may be made in the specific embodiment of the invention as shown and described, and, accordingly, it is to be understood that formal changes may be made in the specific embodiment of the invention described without departing from the spirit or substance of the broad invention, the scope of which is commensurate with the appended claims.

What is claimed is:

1. In an automobile chassis frame structure, in combination, chassis frame side members, a tubular front axle piercing the forward ends of said chassis frame side members and projecting outwardly beyond the outer sides of each thereof, a ring surrounding and welded to each outer end of said front axle, and a king-pin integral with each of said rings.

2. In an automobile chassis frame structure, in combination, a pair of tubular chassis frame side members, one end of each of said side members being of reduced section as compared to the main body portion thereof and having a wall thickness greater than the wall thickness of said main body portion, and a bracket welded to the surface of each of said end portions of increased wall thickness.

3. In an automobile chassis frame structure, in combination, a tubular chassis frame side member, one end of which is reduced in section as compared to the main body portion thereof and is provided with a wall thickness of increased dimension as compared to said main body portion, a plate-like bracket having a notch formed therein complementary to the end portion of said frame side member, said end portion of said frame side member fitting within said notch and being welded therein to said bracket.

4. In an automobile chassis frame structure, in combination, a tubular chassis frame side member, a plate-like member having a notch formed therein, an end of said side frame member being received in said notch and being welded therein to said plate-like member with the axis of said frame side member lying approximately in the plane of said plate-like member.

5. In an automobile chassis frame structure, in combination, a tubular chassis frame side member, one end of said side member being inwardly tapered and provided with a wall thickness of increased dimension as compared to the wall thickness of the main body portion thereof, a plate-like member positioned with the plane thereof approximately including the axis of said frame side member and being shaped to conform to a portion of said tapered end portion of said frame side member and being welded thereto.

6. In an automobile, in combination, chassis frame side members, a plate-like bracket secured to one end of each of said members, each of said brackets having an opening therethrough, a tubular axle housing member projecting through each of said openings and fixed relative to the corresponding bracket and a power unit positioned between said side members and rigidly secured to said brackets.

7. In an automobile, in combination, chassis frame side members, a plate-like member secured to an end of each of said frame side members, each of said plate-like members having an opening therethrough, a collar fixed to each of said plate-like members around said opening therein, a tubular axle housing member telescopically received by said collar and fixed thereto and a power unit positioned between said side members and secured to said brackets.

8. In an automobile, in combination, a chassis frame including frame side members, a plate-like member secured to corresponding ends of each of said frame side members, a unitary power plant including an engine, transmission, clutch and final drive mechanism all rigidly secured relative to one another positioned between said frame side members, said engine being secured in supporting relation between said side members, and tubular axle housing members rigidly secured relative to said final drive mechanism and rigidly secured relative to said plate-like members.

9. In an automobile, in combination, a chassis frame including frame side members, a unitary power plant including an engine, transmission, clutch and final drive mechanism all rigidly secured relative to one another and positioned between said frame side members, a tubular axle housing member fixed relative to each frame side member and projecting inwardly therefrom, flanges at the inner ends of said tubular axle housing members abutting said final drive mechanism, and bolts extending transversely through said final drive mechanism and through the said flanges for both said axle housing members for relieving said final drive mechanism from tensile stresses due to bending loads acting on said axle housing members.

10. In an automobile chassis frame structure, in combination, a pair of tubular chassis frame side members, one end of each of said members being of reduced section as compared to the main body portion thereof and having a wall thickness greater than the wall thickness of the said named body portion, and a plate like bracket welded to the surface of each of said end portions of increased wall thickness, the plane of each bracket lying in substantially the same plane as the axis of each side member.

11. In an automobile, in combination, a chassis frame including side members, a bracket secured to one end of each of said members, a unitary power plant positioned between said side members and including an engine, transmission, clutch and final drive mechanism, said final drive mechanism including tubes rigidly fixed with respect thereto, and said engine and said tubes being rigidly secured to said brackets.

12. In an automobile, in combination, chassis frame side members and elongated brackets secured to one end of each of said members, the plane of each bracket lying in substantially the same plane as the axis of each side member, each of said brackets having an opening therethrough, a tubular axle housing member projecting through each of said openings and fixed relative to the corresponding bracket, and a power unit positioned between said side members and secured to said brackets.

EMIL A. NELSON.